(12) United States Patent
Jeffries et al.

(10) Patent No.: US 7,974,589 B2
(45) Date of Patent: Jul. 5, 2011

(54) HIGH-SPEED DATA TRANSMITTERS

(75) Inventors: Brad Porcher Jeffries, Browns Summit, NC (US); Michael R. Elliott, Summerfield, NC (US)

(73) Assignee: Analog Devices, Inc., Norwood, MA (US)

( * ) Notice: Subject to any disclaimer, the term of this patent is extended or adjusted under 35 U.S.C. 154(b) by 765 days.

(21) Appl. No.: 12/069,969

(22) Filed: Feb. 13, 2008

(65) Prior Publication Data
US 2009/0203333 A1    Aug. 13, 2009

(51) Int. Cl.
*H04B 1/02*    (2006.01)
(52) U.S. Cl. .... 455/91; 455/103; 455/127.1; 455/127.3; 455/127.5; 330/252; 330/253; 330/255; 330/310; 327/108; 327/335; 327/423; 327/588
(58) Field of Classification Search ............... 455/13.1, 455/13.4, 14, 20–22, 24, 39, 70, 73, 82, 84–86, 455/88, 91, 130, 553.1, 562.1, 103, 104, 455/500, 59, 146, 225, 303, 279.1, 575.1, 455/127.1, 127.3, 127.5; 330/252, 253, 255, 330/310; 327/108, 335, 423, 588
See application file for complete search history.

(56) References Cited

U.S. PATENT DOCUMENTS

| | | | | |
|---|---|---|---|---|
| 5,166,648 A | * | 11/1992 | Wen et al. | 333/139 |
| 5,703,541 A | * | 12/1997 | Nakashima | 331/57 |
| 6,356,374 B1 | * | 3/2002 | Farhan | 398/191 |
| 6,477,695 B1 | * | 11/2002 | Gandhi | 716/122 |
| 6,570,406 B2 | * | 5/2003 | Tang et al. | 326/86 |
| 6,580,292 B2 | | 6/2003 | West et al. | 326/83 |
| 6,765,829 B2 | | 7/2004 | Graf et al. | 365/189.07 |
| 6,791,377 B2 | | 9/2004 | Ilchmann et al. | 327/108 |
| 6,792,105 B1 | | 9/2004 | Moyer | 379/402 |
| 6,847,232 B2 | | 1/2005 | Tinsley et al. | 326/84 |
| 7,590,168 B2 | * | 9/2009 | Raghavan et al. | 375/219 |
| 7,675,329 B2 | * | 3/2010 | Kiuchi | 327/108 |
| 2005/0229053 A1 | * | 10/2005 | Sunter | 714/724 |
| 2007/0001760 A1 | * | 1/2007 | Kwon et al. | 330/253 |

OTHER PUBLICATIONS

Ju, Jeff, "Interfacing LVDS with Other Differential I/O Types", EDN Magaizine, Oct. 30, 2003, pp. 81-86.
Dehmelt, Frank, "Performance of LVDS with Different Cables", Analog Applications Journal, Aug. 2000, pp. 30-32.
"LVDS Fundamentals" Application Nosste AN-5017, Fairchild Semiconcuctor Corporation, Dec. 2000, pp. 81, 82, 84 and 85.
"LVDS, PECL, and CML", Maxim Integrated Products, Application Note HFAN-1.0, Oct. 11, 2000, pp. 1-14.
"I/O Interface Standards", Integrated Device Technology, Inc., Application Note AN-230, Jun. 2004, pp. 1-9.

* cited by examiner

*Primary Examiner* — Tuan A Pham
*Assistant Examiner* — Fanghwa Wang
(74) *Attorney, Agent, or Firm* — Koppel, Patrick, Heybl & Philpott

(57) ABSTRACT

Data transmitter embodiments are provided which are particularly useful as interface devices for accurate and reliable transmittal of data from high-speed data system devices such as analog-to-digital converters. Transmitter embodiments have been found to provide excellent fidelity of data transfer at high data rates (e.g., 4 gigabits/second) while consuming only a portion of the power of many conventional transmitters and requiring only a portion of the layout area of these transmitters. Transmitter embodiments provide effective control of transmitter parameters such as matched impedances, data symmetry, common-mode level, data eye and current drain.

6 Claims, 5 Drawing Sheets

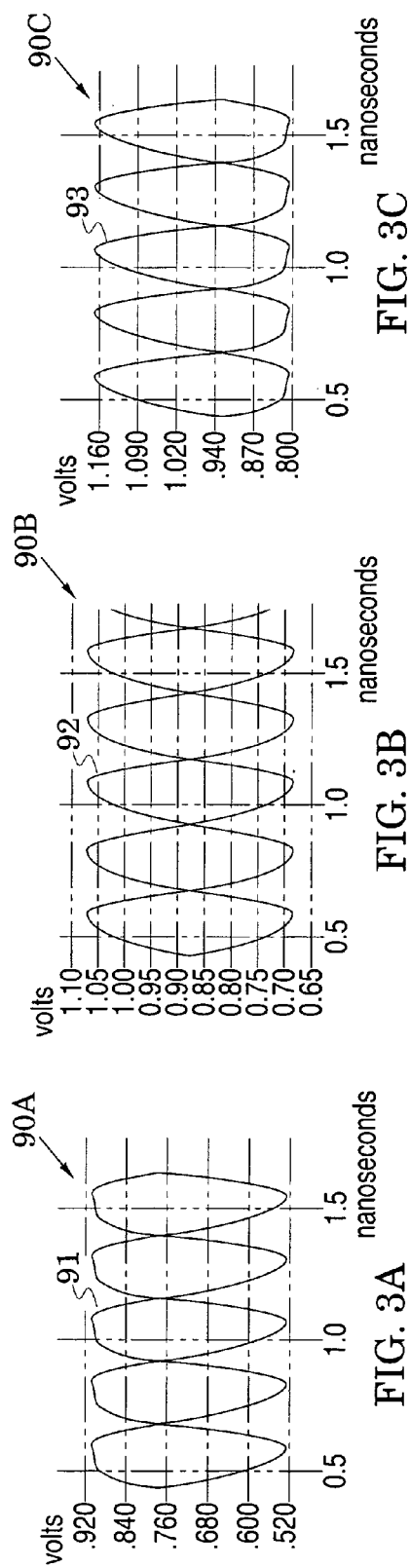
FIG. 3A
FIG. 3B
FIG. 3C
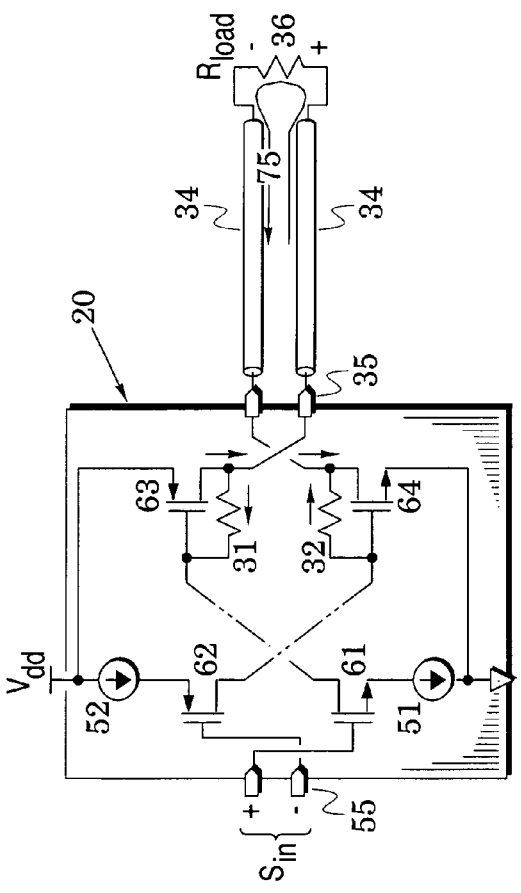
FIG. 2

HIGH-SPEED DATA TRANSMITTERS

BACKGROUND OF THE INVENTION

1. Field of the invention

The present invention relates generally to data interface structures.

2. Description of the Related Art

As the data rate increases in data system devices (e.g., analog-to-digital converters), the reliable transfer of data becomes an increasingly important issue. Because this transfer includes the transfer of data out of one system device and into another system device, it is generally referred to as an input/output (I/O) interface problem. In response to this problem, a number of I/O interfaces have evolved.

An exemplary I/O interface is a low-voltage differential signaling (LVDS) structure in which a predetermined current from a current source is switched so that it passes differentially through a termination resistor. In a typical LVDS transmitter, first and second transistors are coupled in a push-pull arrangement to a current source and third and fourth transistors are also coupled in a push-pull arrangement to the current source (this arrangement of the first, second, third and fourth resistors is sometimes termed an H-bridge).

In response to one input data bit, the predetermined current passes in a first direction through the first transistor, the termination resistor and the fourth transistor. In response to a different input data bit, the predetermined current passes in an opposite second direction through the third transistor, the termination resistor and the second transistor.

The termination resistor is positioned in an LVDS receiver which can generally be separated by a significant distance from the LVDS transmitter. If the termination resistor is a 100 ohm resistor and the predetermined current is 3.5 milliamps, then the nominal differential output voltage is 350 millivolts. An advantage of the LVDS structure is that it can tolerate a fairly large ground potential difference between the transmitter and receiver.

Another exemplary I/O interface is a current-mode logic (CML) structure in which the CML transmitter includes a differential pair of transistors that differentially switch a tail current (e.g., 16 milliamps) across resistors (e.g., 50 ohm resistors. The CML receiver can be another differential pair having termination resistors coupled to their bases and delivering output signals through follower transistors (e.g., emitter followers or source followers).

A third exemplary I/O interface is a positive-referenced emitter-coupled (PECL) structure in which a PECL transmitter comprises a differential pair of transistors that differentially switch a tail current across resistors (e.g., 50 ohm resistors) which each provide an output signal through a respective one of a pair of emitter followers. Signal common-mode is referenced to a supply voltage $V_{cc}$. PECL receivers are generally differential pairs of transistors having termination resistors (e.g., 50 ohm resistors) coupled to their bases. PECL transmitters typically exhibit low output impedances which enhances driving capability but may generate mismatches that cause high-frequency aberrations.

BRIEF SUMMARY OF THE INVENTION

The present invention is generally directed to data interface structures. The drawings and the following description provide an enabling disclosure and the appended claims particularly point out and distinctly claim disclosed subject matter and equivalents thereof.

BRIEF DESCRIPTION OF THE DRAWINGS

FIG. 2 is schematic of the active portion of the transmitter of FIG. 1 in an exemplary data state;

FIGS. 3A-3C are graphs which illustrate data state symmetry and common-mode level for different gate width ratios in the schematic of FIG. 2;

DETAILED DESCRIPTION OF THE INVENTION

Figure 1:
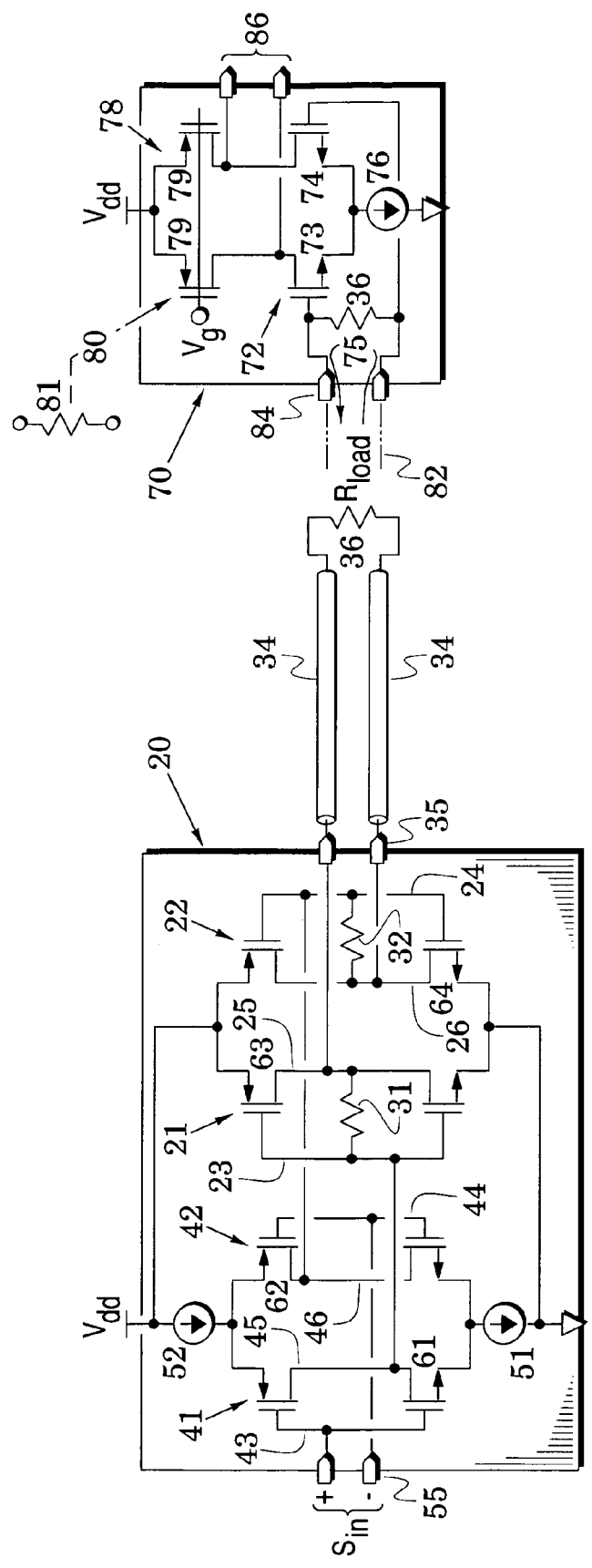
FIG. 1 is a schematic of a data transmitter embodiment.

FIG. 1 illustrates a data transmitter embodiment 20 which is particularly useful as an interface device for accurate and reliable transmittal of data from high-speed data system devices (e.g., analog-to-digital converters). The transmitter 20 has been found to provide excellent fidelity of data transfer at high data rates (e.g., 4 gigabits/second) while consuming only a portion (e.g., 35%) of the power of many conventional transmitters and requiring only a portion (e.g., 35%) of the layout area of these transmitters. It provides effective control of transmitter parameters such as matched impedances, data symmetry, common-mode level, data eye and current drain.

As shown in FIG. 1, the transmitter 20 includes first and second complementary common-source output stages 21 and 22 that are coupled in parallel. The first complementary common-source stage has first coupled gates 23 and first coupled drains 25. The second complementary common-source stage is coupled in parallel with the first stage and has second coupled gates 24 and second coupled drains 26. In addition, a first resistor 31 is coupled between the first coupled gates 23 and the first coupled drains 25 and a second resistor 32 is coupled between the second coupled gates 24 and the second coupled drains 26.

When used for data transfer, the first and second coupled drains 25 and 26 are generally each coupled to a respective one of transmission lines 34 (e.g., printed-circuit lines) at an output port 35. The transmission lines each have a line impedance and these lines are terminated by a load resistance 36 ($R_{load}$) which has an impedance of substantially twice the line impedance. In a transmitter embodiment, the line impedance is 50 ohms.

In the data transmitter described to this point, data output signals are generated via the first and second coupled drains 25 and 26 in response to data input signals between the first and second coupled gates 23 and 24. In another transmitter embodiment, third and fourth complementary common-source input stages 41 and 42 are provided and coupled in parallel. The third stage 41 has third coupled gates 43 and third coupled drains 45 and the fourth stage 42 has fourth coupled gates 44 and fourth coupled drains 46.

The third and fourth stages 41 and 42 are arranged between first and second current sources 51 and 52 and the first and second coupled gates 23 and 24 are arranged to be driven by the third and fourth coupled drains 45 and 46. When the third and fourth coupled gates are driven by data input signals $S_{in}$ at a transmitter input port 55, data output signals are generated via the first and second coupled drains 25 and 26.

A discussion of the operation of the data transmitter 20 is facilitated by considering an exemplary one of the input data states at the input port 55. The selected data state is indicated by plus and minus signs at the input port which respectively correspond with high and low voltages. In the selected input data state, the high signal turns on transistor 61 of the input stage 41 and current of this transistor through the first resistor 31 lowers the gate voltage of transistor 63 of the output stage 21. This action turns on transistor 63 so that a current flows to the upper side of the output port 35. At the same time, the low signal at the input port 55 turns on transistor 62 of the input stage 42 and current of this transistor through the second resistor 32 raises the gate voltage of transistor 64 of the output stage 22. This action turns on transistor 64 so that a current flows from the lower side of the output port 35.

To facilitate a clear understanding of this selected data state, FIG. 2 includes selected elements of FIG. 1 with like elements indicated by like reference numbers. For clarity, FIG. 2 only shows those elements of FIG. 1 which are active in the description of the preceding two paragraphs. The remaining elements are not shown as they are not active during the selected input data state. To further simplify FIG. 2, transistors 62 and 64 are rotated horizontally. The current directions at the drain of transistor 64 are indicated by two small arrows and the currents at the drain of transistor 63 are also indicated by two small arrows.

In operation, transistor 62 switches the current of the current source 52 so that it flows across the second resistor 32 (as indicated by its respective arrow) to turn on transistor 64 by raising its gate voltage. At the same time transistor 61 switches the current of the current source 51 so that it flows across the first resistor 31 (as indicated by its respective arrow) to turn on transistor 63 by lowering its gate voltage. The current 75 through the load resistor 36 is a function of these generated gate-to-source voltages. With this established current 75, the voltage swing across the load resistor 36 (and the voltage at the drains of transistors 64 and 65) is a function of the resistance of the load resistor.

FIG. 2 illustrates the currents and active transistors associated with a selected input data state. When the input data state is the opposite of that shown in FIG. 2, the current 75 reverses its direction because the active transistors are now the other transistors in the third and fourth input stages 41 and 42 and the other transistors in the first and second output stages 21 and 22. The different input data states at the input port 55 generate opposite output currents through the load resistor 36 and these currents (and resultant voltages across the load resistor 36) form output data states which are faithful copies of the input data states.

The output data states can be easily detected by various data receivers. For example, FIG. 1 illustrates a data receiver 70 which includes a differential pair 72 of transistors 73 and 74 that are arranged to receive the tail current of a current source 76. The differential pair can direct the tail current across the high impedance of an active load 78 of transistors 79 which are biased by a gate voltage $V_g$. As suggested by a substitution arrow 80, other loads such as resistors 81 may be substituted for the active load.

As indicated by broken line 82, the transmission lines 34 may terminate at a receiver input port 84 of the data receiver 70 and the load resistor 36 can be coupled across the input port and coupled to the differential input terminals of the differential pair 72. Output data states of the data transmitter 20 now cause the differential pair to steer the tail current of the current source 76 across the active load 78 to thereby provide received data states at a receiver output port 86 which is across the output terminals of the differential pair 72.

To insure that the output data states of the data transmitter 20 are a faithful copy of the input data states at high data rates, it is important to minimize signal reflections at the transmitter output. In a transmitter embodiment, therefore, each of the transmission lines 34 is configured to have a predetermined impedance. Preferably, each end of each of these transmission lines should then be loaded with the same impedance to minimize reflected energies. If the predetermined impedance is 50 ohms, a load resistance of 100 ohms will provide a balanced (i.e., differential) impedance of 50 ohms at the output end of each of the transmission lines. The load impedances are thus well matched to the impedances at the output ports of the transmission lines 34.

To also provide a matched impedance at the input end of each of the transmission lines 34, the output impedances provided by each of the transistors 63 and 64 of FIG. 2 and its respective one of the resistors 31 and 32 should closely approximate the impedance of 50 ohms at each input end of the transmission lines. Because each of the resistors 31 and 32 forms a shunt-shunt feedback loop with its respective one of the transistors 63 and 64, the output impedance facing each of the transmission lines is substantially $1/g_m$ wherein $g_m$ is transconductance of each transistor. Because transconductance is primarily a function of gate width, these transistors can be sized to substantially reduce signal reflections at respective ends of the transmission lines 34.

Sizing of the transistors 63 and 64, however, also affects the common-mode level of the data states at the output port 35 and, thereby, the shape and symmetry of the output data states. For example, the plot 92 in the graph 90B of FIG. 3B illustrates the measured voltage waveform across the load impedance 36 of FIG. 1 when the supply voltage $V_{dd}$ was 1.8 volts, the data rate was on the order of 4 gigabits/second, and the gate width of the p-type transistors was approximately 2.5 times the gate width of the n-type transistors. As shown, the output waveform was substantially symmetrical with an amplitude of approximately 400 millivolts (i.e., an output current of approximately 4 milliamps) and the common-mode level was approximately 875 millivolts.

When the gate width ratio was reduced to substantially one, the waveform amplitude reduced to approximately 370 millivolts, the common-mode level dropped substantially and the waveform distorted as indicated by the plot 91 if the graph 90A of FIG. 3A. When the gate width ratio was increased to substantially five, the waveform amplitude again reduced as the common-mode level rose substantially and the waveform again distorted as indicated by the plot 93 of the graph 90C of FIG. 3C. Therefore, the gate width ratio is preferably in a range distributed about a value of 2.5, e.g., in a range between 1.6 and 4.4.

It has been demonstrated, therefore, that the gate width ratio can be selected (e.g., at a ratio of substantially 2.5) to control the common-mode level of the output data states and obtain substantial symmetry of these states. In addition, the actual gate widths can be set to adjust the output impedance of the transistors 63 and 64 so that they best match the impedance of the transmission lines 34 in FIG. 1. Final values of these gate widths can be selected to best accommodate these different transmitter parameters. Exemplary gate widths in a fabricated data transmitter were selected to be 24 microns for the n-type transistors and 60 microns for the p-type transistors.

Figure 4:
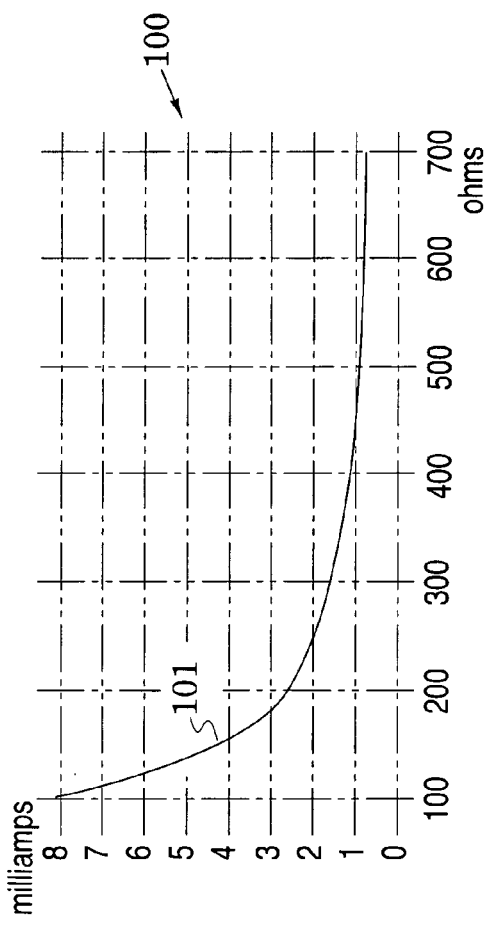
FIG. 4 is a graph of a relationship between currents and resistor values in the transmitter of FIG. 1.

Attention is now directed to selection of the impedance of the first and second resistors 31 and 32. As can be seen from FIG. 2, the gate voltages of the transistors 63 and 64 are a function of this impedance and the amplitude of the currents of current sources 51 and 52. Assuming that a predetermined amplitude of the output current 75 is desired, the currents of current sources 51 and 52 can be reduced as the impedance of the first and second resistors 31 and 32 is increased. For example, the plot 101 of the graph 100 of FIG. 4 shows current and resistor combinations that will all obtain the desired output current 75. The currents of current sources 51 and 52 can be reduced from approximately 8 milliamps to approximately 2.7 milliamps by increasing the impedance of each of the resistors from 100 ohms to 200 ohms. Increasing this impedance to 400 ohms further reduces the supply current to approximately 1.1 milliamps and increasing the impedance again to 700 ohms reduces the supply current further to approximately 0.7 milliamps.

However, the impedance of the first and second resistors 31 and 32 also strongly affects a data eye parameter that can be obtained with the data transmitter 20 of FIG. 1. The data eye has been found to be a useful test parameter because it is a reliable indicator of the detectability of the output data states (e.g., by the data receiver 70 of FIG. 1).

For example, a receiver which is receiving the output data states is generally configured to acquire data at a predetermined assertion edge and they generally have setup and hold times which are the times at which data must be stable prior to and subsequent to the assertion edge in order to assure successful data acquisition. The setup and hold times thus establish an acquisition window about the assertion edge during which the data must be stable so that it can be reliably captured. Because a number of degrading operational effects (e.g., clock jitter and voltage supply noise) will tend to decrease the width and height of the data eye and reduce the available room for the acquisition window, it is important to maximize the initial width and height of the data eye.

Figure 5:
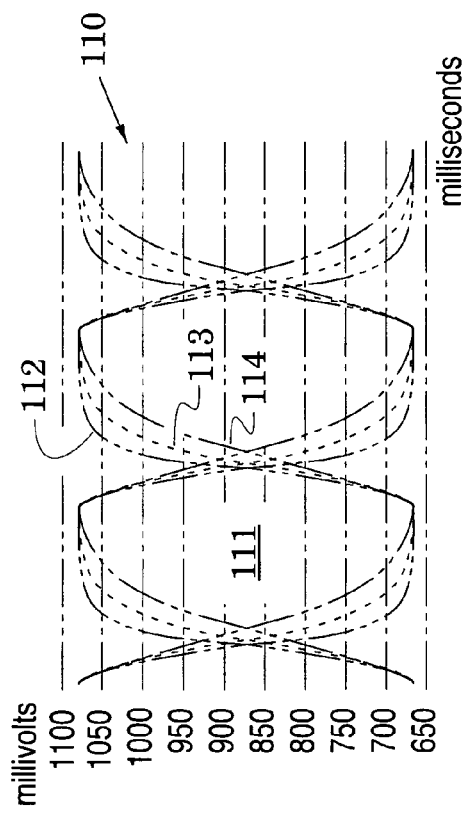
FIG. 5 is an illustration of a data eye parameter as a function of resistor values in the transmitter of FIG. 1.

The data eye can be generated, for example, by processing a digital data stream made up of alternating data bits. The graph 100 of FIG. 5 illustrates output data states obtained for different impedances of the first and second resistors 31 and 32 and indicates the magnitude of a resultant data eye III. Output data states 113 (indicated by broken lines) were obtained when the impedance of the first and second resistors was set to 400 ohms. Output data states 112 and 114 (indicated by different broken lines) were obtained when the impedance of the first and second resistors was respectively decreased to 200 and increased to 700 ohms.

It is thus apparent that transmitter efficiency is enhanced by increasing the impedance of the first and second resistors 31 and 32 but the data eye is enhanced by reducing this impedance. Selecting an intermediate value on the order of 400 ohms (e.g., between 300 and 500 ohms) in the data transmitter 20 of FIG. 1 provides an efficient data transmitter that generates a data eye which insures faithful detection of the output data states.

Another measure of good data transfer through the data transmitter 20 of FIG. 1 is the return loss at the transmitter input port 55. A high value of return loss is realized when very little of the input data energy is reflected back from the input port because this indicates that most of the energy is passing through the port. Return loss measurements have indicated that minimal energy reflection (e.g., return loss greater than 15 dB) is obtained in the data transmitter 20 up to frequencies on the order of 5 gigabits per second.

Because the transmitter 20 has been found to be efficient (i.e., consuming only a portion of the power of conventional transmitters), to be small (i.e., requiring only a portion of the layout areas of conventional transmitters), and to provide excellent fidelity of data transfer, it is particularly useful as an interface device for accurate and reliable transmittal of data from high-speed data system devices such as analog-to-digital converters.

Figure 6:
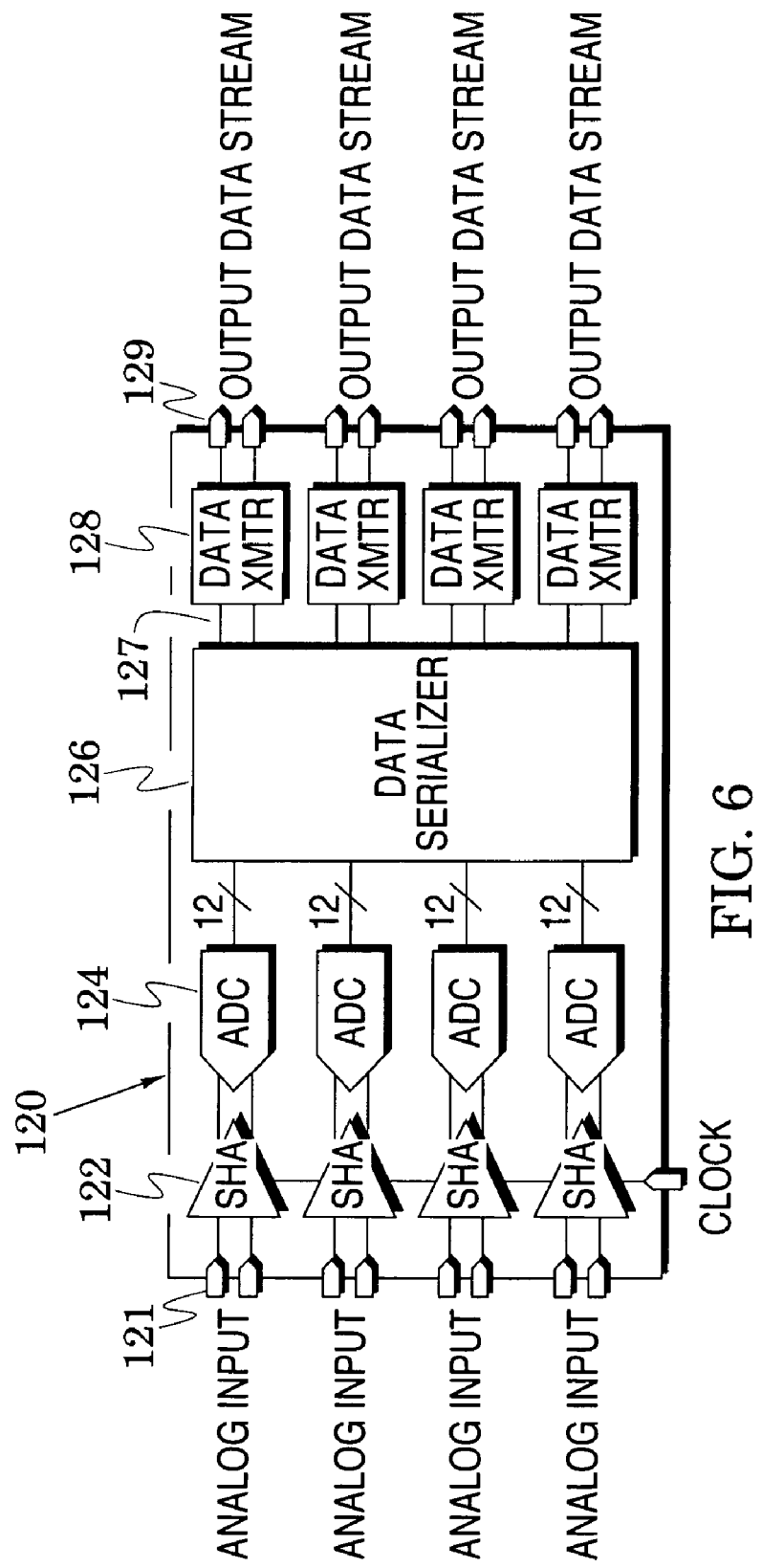
FIG. 6 illustrates an exemplary use of the transmitter of FIG. 1 in a data converter system.

Accordingly, an exemplary application of the data transmitter embodiments is shown in the data converter 120 of FIG. 6 which is configured to process four input analog signals that are received at input ports 121. Each analog signal is sampled with a sampler 122 which provides analog samples to an analog-to-digital converter 124. Each of these converters converts each of its respective analog samples to an N-bit parallel digital word.

In an exemplary converter embodiment, N=12 and the converter is housed in a square integrated circuit chip which measures 7 millimeters on each side. The chip, therefore, only has room for a limited number of input/output pins and a certain number of these pins must be reserved for non-data uses (e.g., clock input, supply voltage, ground, and mode commands). It is, therefore, apparent that the chip cannot provide the 48 pins required to present the parallel digital words of each of the four analog-to-digital converters.

Accordingly, the data converter 120 includes a data serializer 126 which converts the parallel digital words of each analog-to-digital converter to a serial data stream 127 in which each bit is presented differentially. If the clock is at a high rate, the bit rate in the serial data stream 127 can be exceedingly high, e.g., 4 gigabits per second. Therefore, the data converter 120 preferably includes data transmitters 128 which are configured similarly to the data transmitter 20 of FIG. 1 to reliably present the serial output data at output ports 129. It is noted that the load resistor 36 of FIG. 1 and at least a portion of the transmission lines 34 are located externally to the data converter 120.

It was noted above in the discussion of FIG. 2 that the output current 75 was a function of the gate voltages of transistors 63 and 64 and the gate voltages were a function of the currents of current sources 51 and 52 (assuming the resistances of the first and second resistors 31 and 32 are fixed). Therefore, the voltage swing across the load resistor 36 is a function of the currents of current sources 51 and 52. Because this function may vary across fabrication lots of the data transmitters 138 of FIG. 6, a control system may be incorporated into the data converter 120 to stabilize the voltage swing.

Figure 7:
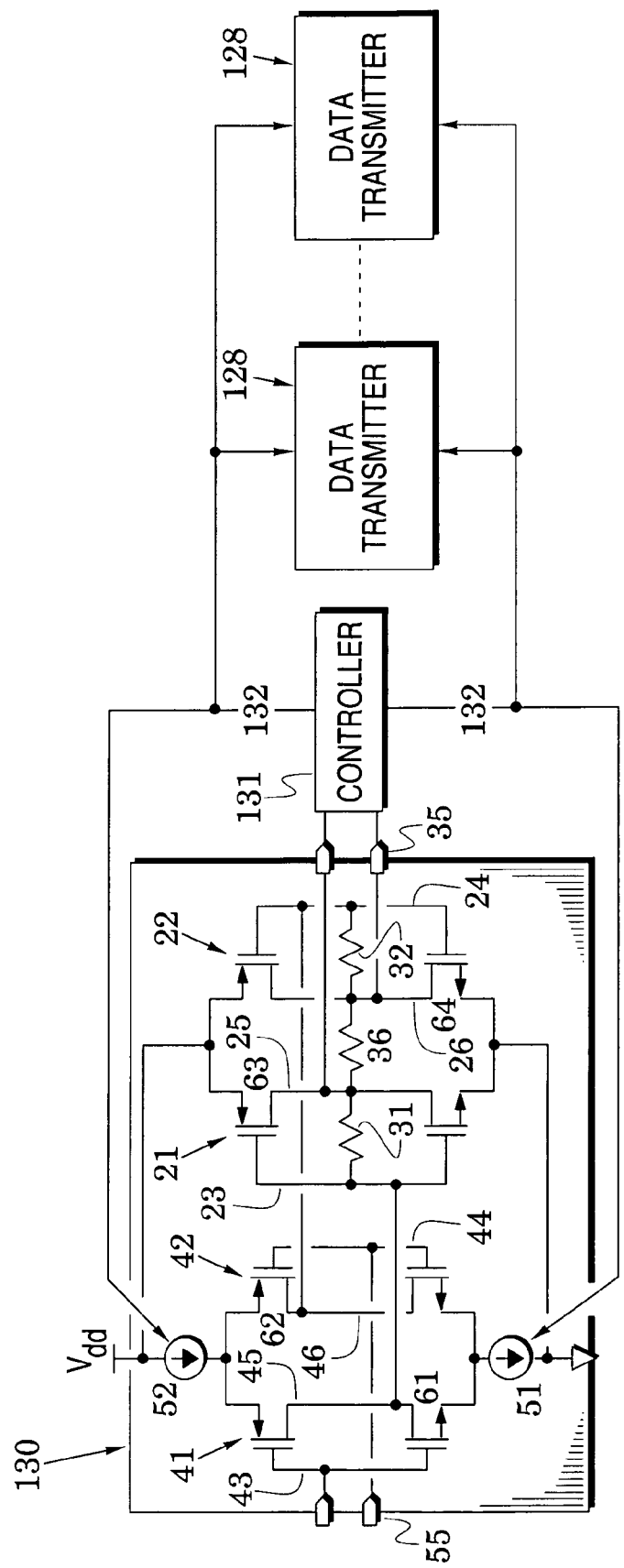
FIG. 7 is an illustration of a control system for controlling lot-to-lot variations in the output voltage swing of the transmitter of FIG. 1.

An exemplary control system is shown in FIG. 7 which shows the data transmitters 128 of FIG. 6 arranged in a control system which includes a control transmitter 130 and a controller 131. The control transmitter 130 is identical to the data transmitters 128 (e.g., identical to the data transmitter 20 of FIG. 1) except that a load resistor 36 is incorporated within the transmitter. The controller 131 monitors the output voltage across the load resistor and automatically adjusts a control signal 132 that alters the currents of the current sources 51 and 52 to thereby maintain a constant value of this output voltage. Because the data transmitters 128 belong to the same fabrication lot as the control transmitter 130, they will also maintain a constant value of their output voltages in response to the same control signal 132.

The embodiments of the invention described herein are exemplary and numerous modifications, variations and rearrangements can be readily envisioned to achieve substantially equivalent results, all of which are intended to be embraced within the spirit and scope of the appended claims.

We claim:

1. A signal converter to provide output data streams through transmission lines each having a predetermined impedance, comprising:
    analog-to-digital converters to each provide parallel digital data in response to an analog input signal;
    a serializer arranged to convert the parallel digital data of each of said converters to a respective one of digital data streams;

data transmitters each arranged to transmit a respective one of said data streams wherein each of said transmitters includes:
  a first complementary common-source stage having first coupled gates and first coupled drains;
  a second complementary common-source stage having second coupled gates and second coupled drains;
  a first resistor coupled between said first coupled gates and said first coupled drains; and
  a second resistor coupled between said second coupled gates and said second coupled drains;
first and second current sources;
a third complementary common-source stage coupled between said first and second current sources and having third coupled gates and third coupled drains;
a fourth complementary common-source stage coupled between said first and second current sources and having fourth coupled gates and fourth coupled drains;
wherein said third coupled drains are coupled to drive said first coupled gates and said fourth coupled drains are coupled to drive said second coupled gates;
and wherein said third and fourth coupled gates are arranged to receive said respective data stream from said serializer;
a respective one of said output data streams thereby provided across said first and second coupled drains to a respective one of said transmission lines;
and further including:
a control transmitter identical to each of said data transmitters and connected to receive one of the data streams of said serializer;
a load resistor driven by said control transmitter;
and a controller coupled to alter currents in first and second current sources in said control transmitter and in said data transmitters to thereby maintain a constant voltage across said load resistor.

2. The converter of claim 1, wherein said first and second complementary stages each comprise an n-type transistor with an n-type gate width and a p-type transistor with a p-type gate width that is N times said n-type gate width wherein N is between 1.6 and 4.4.

3. The converter of claim 1, wherein said first and second resistors each have a resistance between 200 and 700 ohms.

4. A signal converter to provide output data streams through transmission lines each having a predetermined impedance, comprising:
  analog-to-digital converters to each provide digital data in response to an analog input signal;
  a serializer arranged to convert the digital data of each of said converters to a respective one of digital data streams;
  data transmitters each arranged to operate with the currents of first and second current sources and configured to process a respective one of said digital data streams into a respective one of said output data streams
  wherein each of said data transmitters and said control transmitter include:
    a first complementary common-source stage having first coupled gates and first coupled drains;
    a second complementary common-source stage having second coupled gates and second coupled drains;
    a first resistor coupled between said first coupled gates and said first coupled drains; and
    a second resistor coupled between said second coupled gates and said second coupled drains;
  first and second current sources;
  a third complementary common-source stage coupled between said first and second current sources and having third coupled gates and third coupled drains;
  a fourth complementary common-source stage coupled between said first and second current sources and having fourth coupled gates and fourth coupled drains; wherein said third coupled drains are coupled to drive said first coupled gates and said fourth coupled drains are coupled to drive said second coupled gates; and wherein said third and fourth coupled gates are arranged to receive said respective digital data stream from said serializer;
  a respective one of said output data streams thereby provided across said first and second coupled drains to a respective one of said transmission lines;
  and further including:
  a control transmitter identical to each of said data transmitters and connected to receive one of the digital data streams of said serializer;
  a load resistor driven by said control transmitter; and
  a controller coupled to alter currents in first and second current sources in said control transmitter and in said data transmitters to thereby maintain a constant voltage across said load resistor.

5. The converter of claim 4, wherein said first and second complementary stages each comprise an n-type transistor with an n-type gate width and a p-type transistor with a p-type gate width that is N times said n-type gate width wherein N is between 1.6 and 4.4.

6. The converter of claim 4, wherein said first and second resistors each have a resistance between 200 and 700 ohms.

* * * * *